A. H. DIXON.
TEETH FOR GRAIN-DRILLS.

No. 174,067. Patented Feb. 29, 1876.

Witnesses.
W. B. Masson
Edmund Masson

Inventor.
Aaron H. Dixon
By atty. A. B. Stoughton.

UNITED STATES PATENT OFFICE.

AARON H. DIXON, OF AUBURN, N. Y., ASSIGNOR OF TWO-THIRDS HIS RIGHT TO EDWIN R. RICHARDSON AND CALVIN YOUNG, OF SAME PLACE.

IMPROVEMENT IN TEETH FOR GRAIN-DRILLS.

Specification forming part of Letters Patent No. 174,067, dated February 29, 1876; application filed December 6, 1875.

*To all whom it may concern:*

Be it known that I, AARON H. DIXON, of Auburn, in the county of Cayuga and State of New York, have invented certain new and useful Improvements in Teeth for Grain-Drills; and that the following is a full, clear, and exact description of the same, reference being had to the accompanying drawings making a part of this specification, in which—

Figure 1:
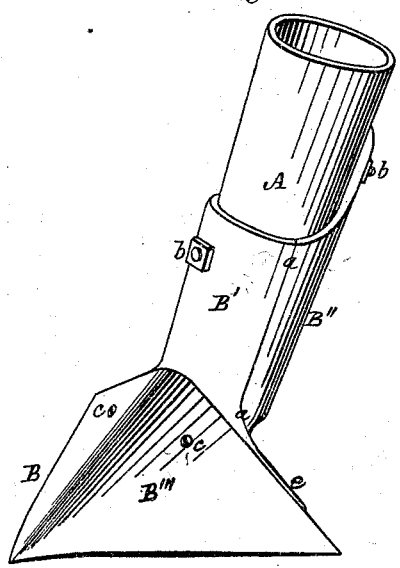
Figure 2:
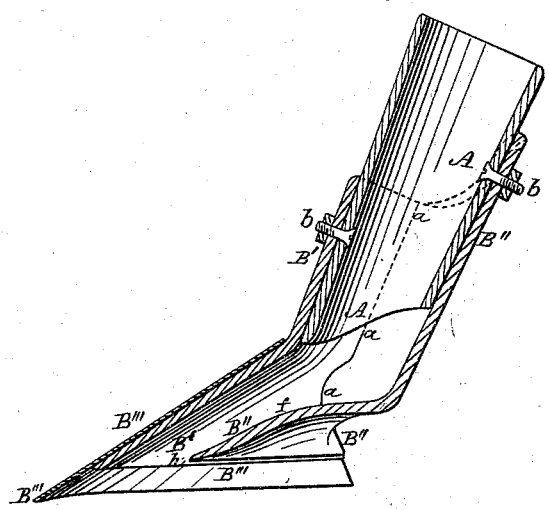
Figure 3:
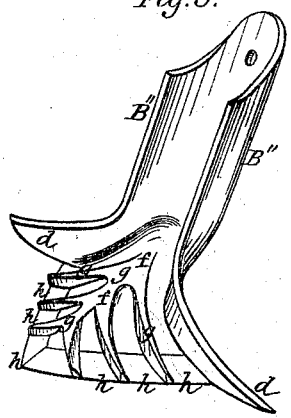

Figure 1 represents in perspective the exterior of the tooth. Fig. 2 represents a vertical section through the same. Fig. 3 represents in perspective, and detached, the after part of the tooth, having thereon the distributing device for scattering the grain broadcast-like in the furrow.

I am aware that many devices have been essayed, which were placed in or near the bottom of a seed-tube, to act as scatterers and spread the seed in the furrow. These I do not claim independent of my particular construction of drill-tooth.

My invention consists in certain branched channels formed on the trowel-shaped bottom of the posterior half or part of the tooth for conducting the seeds into different parts of the furrow, as will be explained.

A represents the seed-tube (or lower end of it) of any ordinary grain-drill. To this tube is attached the tooth, shoe, or furrow opener and closer, as will be explained. The tooth, shoe, or furrow opener and closer is shown at B. It is composed substantially of two parts, B' and B'', separable at the line $a\ a$, so as to be easily cast; but the front and point of the part B' is covered by a double mold-board, B''', of sheet-steel, or of iron, to protect said part B'. The two parts of the tooth or shoe B' B'' are fastened to the tube A by nut and screw, as at $b\ b$, and the mold-board is fastened to the part B' by screws $c\ c$.

On the after part B'' of the tooth are formed wings $d\ d$, which fit against the projections $e$ of the front part B', so as to close up that part of the shoe. On the raised trowel-shaped portion $f$ of the rear portion B'' are formed branched ridges $g$, which leave channels or gutters $h$ between them, through which the grain falling on the portion $f$, or upon the ridges $g$, or into the channels $h$, is conducted into different parts of the opened furrow, where it is covered up. The grain, by this device, is very evenly distributed over the furrow, and uniformly covered; and this form of distributer requires no rods or other holders to fasten it to the tooth, and hence has no obstructions to the falling or moving seed.

What I claim is—

In combination with the tooth or shoe of the seed-drill, the branched ridges $g$ and the channels $h$ between them, and located upon the deflector, for conducting the grain into the furrow, and at the same time evenly distributing it in the furrow, as described and represented.

AARON H. DIXON.

Witnesses:
JAS. R. COX,
WILLIAM C. COX.